United States Patent
Melfi

(10) Patent No.: US 7,385,328 B2
(45) Date of Patent: Jun. 10, 2008

(54) COGGING REDUCTION IN PERMANENT MAGNET MACHINES

(75) Inventor: Michael J. Melfi, Euclid, OH (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 11/438,753

(22) Filed: May 23, 2006

(65) Prior Publication Data

US 2007/0273234 A1    Nov. 29, 2007

(51) Int. Cl.
*H02K 1/27* (2006.01)
(52) U.S. Cl. .............................. 310/156.45; 310/156.53
(58) Field of Classification Search ........... 310/156.38, 310/156.45, 156, 156.56, 156.41, 156.53
See application file for complete search history.

(56) References Cited

U.S. PATENT DOCUMENTS

| | | | |
|---|---|---|---|
| 4,280,072 A | 7/1981 | Gotou et al. | |
| 4,504,755 A | 3/1985 | Semones et al. | |
| 4,672,253 A | 6/1987 | Tajima et al. | |
| 4,692,645 A | 9/1987 | Gotou | |
| 4,692,646 A | 9/1987 | Gotou | |
| 4,713,569 A | 12/1987 | Schwartz | |
| 4,918,831 A | 4/1990 | Kliman et al. | |
| 4,924,130 A | 5/1990 | Fratta et al. | |
| 4,939,398 A | 7/1990 | Lloyd et al. | |
| 5,030,864 A | 7/1991 | Van Hout et al. | |
| 5,099,182 A | 3/1992 | Isaacson et al. | |
| 5,105,113 A | 4/1992 | Ishikura et al. | |
| 5,117,553 A | 6/1992 | Kliman et al. | |
| 5,159,220 A | 10/1992 | Kliman et al. | |
| 5,250,867 A | 10/1993 | Gizaw | |
| 5,258,678 A | 11/1993 | Futami et al. | |
| 5,304,882 A | 4/1994 | Lipo et al. | |
| 5,363,004 A | 11/1994 | Futami et al. | |
| 5,510,662 A | 4/1996 | Tanimoto et al. | |
| 5,523,637 A | 6/1996 | Miller | |
| 5,581,140 A | 12/1996 | Futami et al. | |
| 5,650,680 A | 7/1997 | Chula et al. | |
| 5,663,605 A | 9/1997 | Evans et al. | |
| 5,666,015 A | 9/1997 | Uchibori et al. | |
| 5,672,926 A | 9/1997 | Brandes et al. | |
| 5,684,352 A | 11/1997 | Mita et al. | |
| 5,693,995 A | 12/1997 | Syverson et al. | |
| 5,731,647 A | 3/1998 | Schuller et al. | |

(Continued)

FOREIGN PATENT DOCUMENTS

JP    2004088846 A  *  3/2004

(Continued)

OTHER PUBLICATIONS

Translation of Japanese Pat App. Publication 2004-88846 (Shimormura); Mar. 18, 2004.

(Continued)

*Primary Examiner*—Dang D Le
(74) *Attorney, Agent, or Firm*—Thompson Coburn LLP

(57) ABSTRACT

A permanent magnet motor having a rotor and a stator and configured such that when the leading edge of each pole of the rotor aligns with a stator tooth the trailing edge of that pole is generally not aligned with a stator tooth.

18 Claims, 4 Drawing Sheets

U.S. PATENT DOCUMENTS

| | | | |
|---|---|---|---|
| 5,747,909 A | 5/1998 | Syverson et al. | |
| 5,757,100 A | 5/1998 | Burgbacher | |
| 5,801,463 A | 9/1998 | Suzuki et al. | |
| 5,811,908 A | 9/1998 | Iwata et al. | |
| 5,823,165 A | 10/1998 | Sato et al. | |
| 5,838,086 A | 11/1998 | Cuenot et al. | |
| 5,841,212 A | 11/1998 | Mita et al. | |
| 5,861,693 A | 1/1999 | Takahashi et al. | |
| 5,864,191 A | 1/1999 | Nagate et al. | |
| 5,864,192 A | 1/1999 | Nagate et al. | |
| 5,929,547 A | 7/1999 | Kim et al. | |
| 5,936,323 A | 8/1999 | Shibukawa et al. | |
| 5,945,760 A | 8/1999 | Honda et al. | |
| 5,962,944 A | 10/1999 | Narita et al. | |
| 5,990,591 A | 11/1999 | Yamaguchi et al. | |
| 5,990,592 A | 11/1999 | Miura et al. | |
| 5,990,593 A | 11/1999 | Narita et al. | |
| 6,008,559 A | 12/1999 | Asano et al. | |
| 6,013,963 A | 1/2000 | Shelton et al. | |
| 6,025,666 A | 2/2000 | Kliman et al. | |
| 6,025,667 A | 2/2000 | Narita et al. | |
| 6,031,311 A * | 2/2000 | Lee | 310/156.57 |
| 6,034,459 A | 3/2000 | Matsunobu et al. | |
| 6,034,460 A | 3/2000 | Tajima et al. | |
| 6,049,153 A | 4/2000 | Nishiyama et al. | |
| 6,072,256 A | 6/2000 | Shon et al. | |
| 6,087,751 A | 7/2000 | Sakai | |
| 6,087,752 A | 7/2000 | Kim et al. | |
| 6,121,706 A | 9/2000 | Nashiki et al. | |
| 6,127,764 A | 10/2000 | Torok et al. | |
| 6,133,662 A | 10/2000 | Matsunobu et al. | |
| 6,133,663 A | 10/2000 | Hoemann et al. | |
| 6,144,131 A | 11/2000 | Hollenbeck et al. | |
| 6,147,429 A | 11/2000 | Akemakou et al. | |
| 6,177,745 B1 | 1/2001 | Narita et al. | |
| 6,181,035 B1 | 1/2001 | Acquaviva | |
| 6,188,157 B1 * | 2/2001 | Tajima et al. | 310/156.11 |
| 6,204,584 B1 | 3/2001 | Muszynski | |
| 6,218,753 B1 | 4/2001 | Asano et al. | |
| 6,268,677 B1 | 7/2001 | Takabatake et al. | |
| 6,329,734 B1 | 12/2001 | Takahashi et al. | |
| 6,340,857 B2 | 1/2002 | Nishiyama et al. | |
| 6,342,745 B1 | 1/2002 | Sakai et al. | |
| 6,351,050 B1 | 2/2002 | Ronald et al. | |
| 6,353,275 B1 | 3/2002 | Nishiyama et al. | |
| 6,356,001 B1 | 3/2002 | Nishiyama et al. | |
| 6,369,480 B1 | 4/2002 | Nishiyama et al. | |
| 6,373,162 B1 | 4/2002 | Liang et al. | |
| 6,380,654 B1 | 4/2002 | Dokonal et al. | |
| 6,396,183 B1 | 5/2002 | Tajima et al. | |
| 6,424,069 B1 | 7/2002 | Pullen et al. | |
| 6,429,565 B1 | 8/2002 | Matsunobu et al. | |
| 6,429,566 B1 | 8/2002 | Kuwahara et al. | |
| 6,437,473 B1 | 8/2002 | Mobius et al. | |
| 6,437,474 B1 | 8/2002 | Chu et al. | |
| 6,441,523 B1 | 8/2002 | Koharagi et al. | |
| 6,441,524 B2 * | 8/2002 | Kaneko et al. | 310/156.45 |
| 6,441,525 B1 | 8/2002 | Koharagi et al. | |
| 6,462,449 B1 | 10/2002 | Lucidarme et al. | |
| 6,462,451 B1 | 10/2002 | Kimura et al. | |
| 6,472,789 B1 | 10/2002 | Akemakou et al. | |
| 6,486,581 B2 | 11/2002 | Miyashita et al. | |
| 6,512,317 B2 | 1/2003 | Lai et al. | |
| 6,525,442 B2 | 2/2003 | Koharagi et al. | |
| 6,528,920 B2 | 3/2003 | Matsunobu et al. | |
| 6,531,799 B1 | 3/2003 | Miller et al. | |
| 6,552,461 B2 | 4/2003 | Takahata et al. | |
| 6,552,462 B2 | 4/2003 | Sakai et al. | |
| 6,555,940 B2 | 4/2003 | Naito et al. | |
| 6,582,207 B2 | 6/2003 | Matsumoto et al. | |
| 6,590,312 B1 | 7/2003 | Seguchi et al. | |
| 6,597,079 B2 | 7/2003 | Miyashita et al. | |
| 6,657,350 B2 | 12/2003 | Kimura et al. | |
| 6,664,688 B2 | 12/2003 | Naito et al. | |
| 6,674,205 B2 | 1/2004 | Biais et al. | |
| 6,703,743 B2 | 3/2004 | Kaneko et al. | |
| 6,703,744 B2 | 3/2004 | Yoshinaga et al. | |
| 6,703,745 B2 | 3/2004 | Chu | |
| 6,703,746 B2 | 3/2004 | Biais et al. | |
| 6,707,209 B2 | 3/2004 | Crapo et al. | |
| 6,710,494 B2 | 3/2004 | Hatz et al. | |
| 6,713,923 B2 | 3/2004 | Hino et al. | |
| 6,727,623 B2 | 4/2004 | Horst et al. | |
| 6,727,627 B1 | 4/2004 | Sasaki et al. | |
| 6,727,628 B2 | 4/2004 | Shimada et al. | |
| 6,734,592 B2 | 5/2004 | Tajima et al. | |
| 6,741,002 B2 | 5/2004 | Nishiyama et al. | |
| 6,741,003 B2 | 5/2004 | Naito et al. | |
| 6,753,632 B1 | 6/2004 | Hartsfield, Jr. | |
| 6,759,776 B2 | 7/2004 | Takahata et al. | |
| 6,759,778 B2 | 7/2004 | Nishiyama et al. | |
| 6,768,238 B2 | 7/2004 | Knauff et al. | |
| 6,774,519 B2 | 8/2004 | Pullen et al. | |
| 6,774,521 B2 | 8/2004 | Inayama et al. | |
| 6,774,523 B2 | 8/2004 | Ahn et al. | |
| 6,781,274 B2 | 8/2004 | Lee et al. | |
| 6,784,582 B1 | 8/2004 | Kolomeitsev et al. | |
| 6,784,590 B2 | 8/2004 | Ohnishi et al. | |
| 6,788,013 B2 | 9/2004 | Islam et al. | |
| 6,794,784 B2 | 9/2004 | Takahashi | |
| 6,798,103 B2 | 9/2004 | Tajima et al. | |
| 6,803,690 B2 | 10/2004 | Bosch et al. | |
| 6,803,692 B2 | 10/2004 | Hattori et al. | |
| 6,815,858 B2 | 11/2004 | Matsunobu et al. | |
| 6,815,859 B2 | 11/2004 | Sakuma et al. | |
| 6,822,360 B2 | 11/2004 | Tajima et al. | |
| 6,836,044 B2 | 12/2004 | Ando et al. | |
| 6,836,045 B2 | 12/2004 | Murakami et al. | |
| 6,838,798 B2 | 1/2005 | Takahata et al. | |
| 6,841,916 B2 | 1/2005 | Chiarenza | |
| 6,844,652 B1 | 1/2005 | Chu et al. | |
| 6,847,143 B1 | 1/2005 | Akemakou | |
| 6,847,144 B1 | 1/2005 | Luo | |
| 6,849,981 B2 | 2/2005 | Kojima et al. | |
| 6,849,983 B2 | 2/2005 | Tajima et al. | |
| 6,853,106 B2 | 2/2005 | Fujiwara et al. | |
| 6,856,051 B2 | 2/2005 | Reiter, Jr. et al. | |
| 6,858,956 B2 | 2/2005 | Nakajima | |
| 6,858,960 B1 * | 2/2005 | Muszynski | 310/156.47 |
| 6,858,961 B2 | 2/2005 | Tagome et al. | |
| 6,867,514 B2 | 3/2005 | Fecera | |
| 6,876,117 B2 | 4/2005 | Tajima et al. | |
| 6,876,119 B2 | 4/2005 | Sasaki et al. | |
| 6,885,122 B2 | 4/2005 | Kaneko et al. | |
| 6,885,125 B2 | 4/2005 | Inayama et al. | |
| 6,888,270 B2 | 5/2005 | Reiter, Jr. et al. | |
| 6,891,297 B2 * | 5/2005 | Shimada et al. | 310/156.01 |
| 6,891,298 B2 | 5/2005 | Gary | |
| 6,897,590 B2 | 5/2005 | Popov | |
| 6,897,595 B1 | 5/2005 | Chiarenza | |
| 6,906,444 B2 | 6/2005 | Hattori et al. | |
| 6,917,133 B2 | 7/2005 | Koharagi et al. | |
| 6,917,136 B2 | 7/2005 | Thornton et al. | |
| 6,919,662 B2 | 7/2005 | Tagome et al. | |
| 6,919,663 B2 | 7/2005 | Iles-Klumpner | |
| 6,922,000 B2 | 7/2005 | Kusase et al. | |
| 6,927,519 B2 | 8/2005 | Popov | |
| 6,933,644 B2 | 8/2005 | Kanebako | |
| 6,936,945 B2 | 8/2005 | Murakami et al. | |
| 6,946,766 B2 | 9/2005 | Gary et al. | |
| 6,949,856 B2 | 9/2005 | Tajima et al. | |
| 6,954,018 B2 | 10/2005 | Kim et al. | |
| 6,956,311 B2 | 10/2005 | Hosaka | |
| 6,963,154 B2 | 11/2005 | Matsunobu et al. | |

| | | | | | | |
|---|---|---|---|---|---|---|
| 6,967,420 | B2 | 11/2005 | Laurent et al. | 7,215,055 B2 | 5/2007 | Tajima et al. |
| 6,967,424 | B2 | 11/2005 | Popov | 7,218,019 B2 | 5/2007 | Potter |
| 6,972,504 | B1 | 12/2005 | Hsu | 7,221,071 B2 | 5/2007 | Fratta |
| 6,979,924 | B2 | 12/2005 | Nishiyama et al. | 7,230,359 B2 | 6/2007 | Iles-Klumpner |
| 6,987,341 | B2 | 1/2006 | Chang et al. | 7,233,089 B2 | 6/2007 | Matsunobu et al. |
| 6,987,342 | B2 | 1/2006 | Hans et al. | 7,250,703 B2 | 7/2007 | Nitta et al. |
| 6,987,343 | B2 | 1/2006 | Tagome et al. | 7,262,526 B2 | 8/2007 | Shiga et al. |
| 6,989,619 | B2 | 1/2006 | Hall et al. | 2003/0178905 A1* | 9/2003 | Koharagi et al. ...... 310/156.38 |
| 7,002,276 | B2 | 2/2006 | Evans et al. | 2003/0201685 A1* | 10/2003 | Shimada et al. ....... 310/156.53 |
| 7,015,614 | B2 | 3/2006 | Sakuma et al. | 2005/0001503 A1* | 1/2005 | Hans ..................... 310/156.53 |
| 7,019,427 | B2 | 3/2006 | Sasaki et al. | 2005/0023922 A1* | 2/2005 | Araki et al. ................. 310/168 |
| 7,032,859 | B2 | 4/2006 | Mohr et al. | 2005/0200223 A1* | 9/2005 | Tajima et al. .......... 310/156.46 |
| 7,038,345 | B2 | 5/2006 | Fratta et al. | 2005/0264122 A1* | 12/2005 | Domeki et al. ........ 310/156.46 |
| 7,042,127 | B2 | 5/2006 | Tsuruta et al. | 2007/0103024 A1 | 5/2007 | Nakayama et al. |
| 7,051,421 | B2 | 5/2006 | Biais et al. | | | |
| 7,057,322 | B2 | 6/2006 | Araki et al. | | | |
| 7,088,011 | B2 | 8/2006 | Smith et al. | | | |

FOREIGN PATENT DOCUMENTS

JP        2006115584 A   *   4/2006

OTHER PUBLICATIONS

Translation of Japanese Pat App. Publication 2006-115584 (Egawa); Apr. 27, 2006.

Bolton, H.R., et al., Influence of Motor Design and Feed-current Waveform on Torque Ripple in Brushless DC Drives, IEE Proceedings, May 1984, pp. 82-90, vol. 131 Pt. B No. 3.

Chalmers, B.J., et al., Parameters and Performance of a High-Field Permanent-magnet Synchronour Motor for Variable-Frequency Operation, IEE Proceedings, May 1985, pp. unknown, vol. 132 Pt. B, No. 3.

Chalmers, B.J. et al., Synchronous Performance Prediction for High-Field Permanent Magnet Synchronous Motors, International Conference on Electric Machines, 1986.

Miller, T.J.E., Brushless Permanent-Magnet and Reluctance Motor Drives, Oxford Science Publications, 1989, pp. 55-117, Clarendon Press, Oxford.

| | | | |
|---|---|---|---|
| 7,091,643 | B2 | 8/2006 | Burgbacher et al. |
| 7,102,263 | B2 | 9/2006 | Takano et al. |
| 7,105,971 | B2 | 9/2006 | Asai et al. |
| 7,105,974 | B2 | 9/2006 | Nashiki et al. |
| 7,109,624 | B2 | 9/2006 | Yashiro et al. |
| 7,112,908 | B2 | 9/2006 | Takita et al. |
| 7,119,470 | B2 | 10/2006 | Tajima et al. |
| 7,122,930 | B2 | 10/2006 | Yamagishi et al. |
| 7,129,611 | B2 | 10/2006 | Hsu |
| 7,138,742 | B2 | 11/2006 | Arimitsu et al. |
| 7,148,597 | B2 | 12/2006 | Matsunobu et al. |
| 7,151,335 | B2 | 12/2006 | Tajima et al. |
| 7,151,336 | B2 | 12/2006 | Yokochi et al. |
| 7,157,827 | B2 | 1/2007 | Heideman et al. |
| 7,170,209 | B2 | 1/2007 | Araki et al. |
| 7,183,685 | B2 | 2/2007 | Weihrauch |
| 7,183,686 | B2 | 2/2007 | Sasaki et al. |
| 7,196,446 | B2 | 3/2007 | Hans |
| 7,196,447 | B2 | 3/2007 | Tajima et al. |
| 7,204,012 | B2 | 4/2007 | Kloepzig et al. |

* cited by examiner

COGGING REDUCTION IN PERMANENT MAGNET MACHINES

BACKGROUND

The invention relates generally to electric machines and, more specifically, to permanent magnet electric machines with reduced cogging effects.

Permanent magnet machines, such as a generator or an electric motor, typically include a rotor and a stator. For instance, in synchronous electric motors, the rotor may include permanent magnets to form magnetic poles. The magnetic poles are typically rotationally symmetrically disposed about the rotor. In these motors, the stator often includes a number of windings disposed between regularly spaced teeth. A time varying electric current passing through the windings creates a rotating magnetic field that interacts with the poles of the rotor. The magnetic field from the stator drives the rotor by repelling and/or attracting the magnetic poles of the rotor, thereby converting electrical energy into mechanical energy.

Synchronous electric motors often generate a torque as they rotate between adjacent teeth. This torque, which is generally undesireable and unrelated to the intended output torque, is referred to as cogging or a cogging torque. The torque generally results from the fact that the teeth of the stator often include ferromagnetic materials. Consequently, each magnetic pole of the rotor may be attracted to a number of adjacent teeth. As the rotor rotates, torque attributable to this attraction may vary as the edge of each pole crosses between teeth. During operation, this cogging torque may reduce the efficiency of the motor and cause vibrations that can adversely affect both the motor and driven loads, and that can, consequently, add maintenance costs to the motor, bearings and related equipment. This cogging torque also can degrade the quality of the product associated with the driven load.

While various approaches have been taken to reduce or avoid such cogging, these have not provided a suitable solution. For example, the number of teeth in the stator may be varied such that the number of teeth (and consequently the number of stator windings) is not an integer multiple of the number of poles. However, such solutions result in stators that may be difficult to wind or otherwise manufacture, particularly by machine-installation of windings in the stator slots. These designs may also result in electromagnetic dissymmetries leading to degraded machine performance. To some extent, the magnets of the rotor may be installed such that they are non-parallel to the stator teeth (i.e., skewed along their length). However, this approach limits the use of standard laminates and other simple and cost-effective structures for the rotor.

There is a need, therefore, for a new approach to the problem of cogging in permanent magnet motors. There is a particular need for an approach that can be used with motors having a number of stator windings that is a multiple of the number of poles, and that can be used with conventional unskewed permanent magnet rotors.

BRIEF DESCRIPTION

The invention provides, in some embodiments, a permanent magnet motor having a rotor and a stator. The rotor of some embodiments may have a plurality of permanent magnets defining a plurality of poles, which may each have a leading edge and a trailing edge. The stator may include a plurality of teeth that are generally parallel to the rotational axis of the motor. The number of teeth in some embodiments may be an integer multiple of the number of poles. The teeth and poles of some of these embodiments may be arranged such that when the leading edge of each pole aligns with a stator tooth the trailing edge of that pole is generally not aligned with a stator tooth.

In another aspect, the invention provides an electric motor having a rotor with a plurality of poles defined by permanent magnets. Each of the poles may have a flux field with a first flux edge and a second flux edge. These embodiments may also include a stator having winding slots separated by respective teeth. The number of teeth may be an integer multiple of the number of poles. In some embodiments, at least one flux edge does not generally align with a tooth at the same time that another flux edge generally aligns with a tooth.

In another aspect, the invention provides a permanent magnet motor including a rotor having a plurality of permanent magnets defining a plurality of poles, each pole having a leading edge and a trailing edge, and a stator having a plurality of teeth that are generally parallel to the rotational axis of the motor. In some embodiments, the number of teeth is an integer multiple of the number of poles, and the leading and trailing edges of each pole are angularly disposed with respect to the stator teeth to reduce cogging torque.

In another aspect, the present invention provides a method including steps of providing a stator having a plurality of teeth separated by winding slots, wherein each tooth and an adjacent winding slot defines one tooth pitch, and providing a rotor having a plurality of poles extending generally parallel to the teeth, each pole having a pole width. In some embodiments, the smallest difference in size between at least one pole width and an integer multiple of the tooth pitch is greater than 10% of the tooth pitch.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
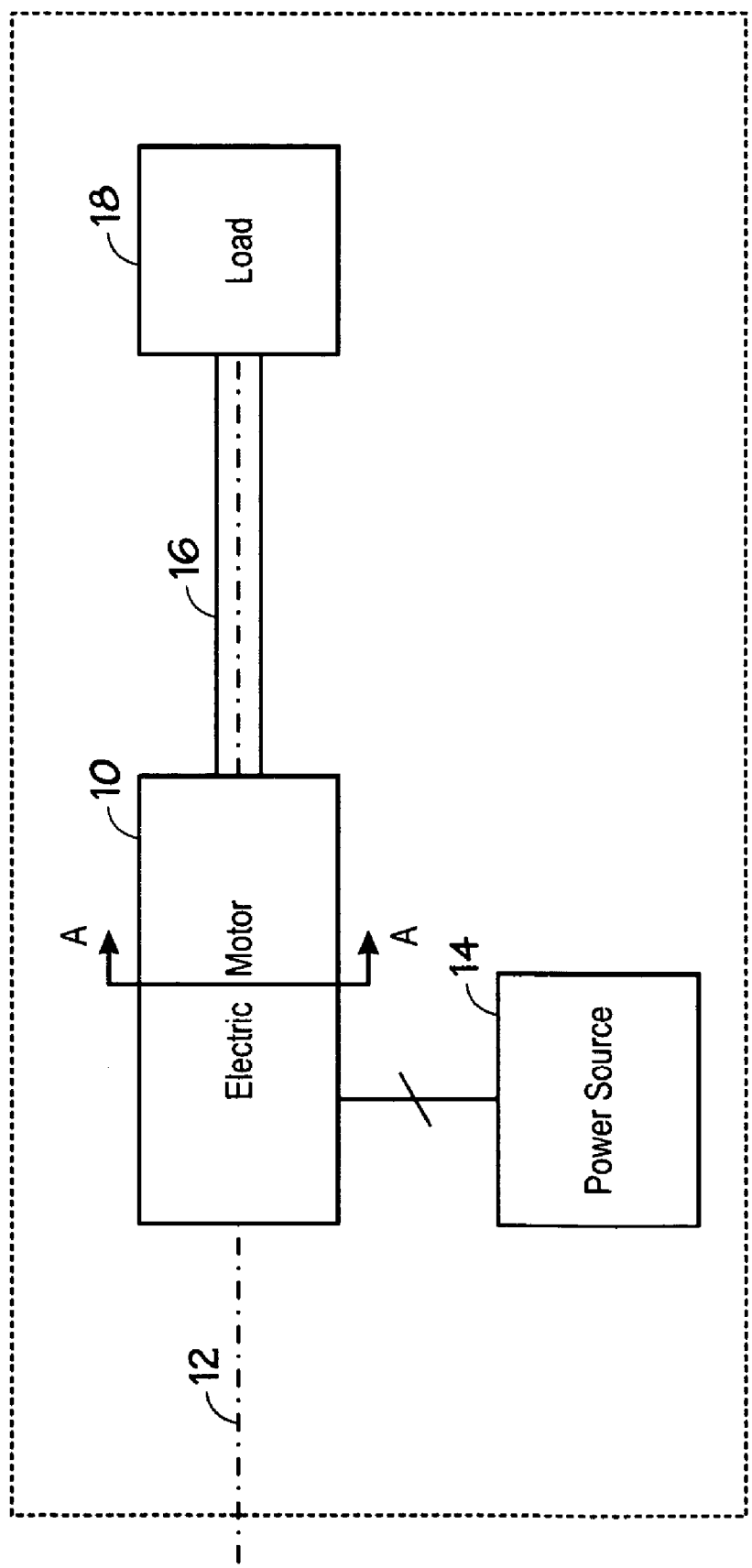
FIG. 1 is an illustration of an exemplary motor system, including a motor in accordance with an embodiment of the present technique.

FIG. 1 illustrates an exemplary system that includes a motor 10 having an axis of rotation 12, a power source 14, a shaft 16, and a load 18. As explained further below, the motor 10 may generate minimal cogging torque. In subsequently discussed embodiments, the motor 10 includes a rotor with magnetic poles that are spatially desynchronized with teeth in a stator. To this end, in certain embodiments, the magnetic poles may have an angular width that is not an integer multiple of the pitch of the teeth. As the rotor rotates, when the leading edge of a magnetic pole is aligned with a tooth, the trailing edge of the magnetic pole is between teeth, and vise versa. Advantageously, some of these embodiments may mitigate the previously discussed cogging effect. It is believed that staggering the time at which the leading and trailing edges of a pole are aligned with stator teeth reduces the torque applied to the rotor as it rotates between teeth, as is explained in greater detail below.

The system in which the motor 10 is installed may be a variety of electro-mechanical systems. For example, the system may be a factory automation system, an automotive system, a transportation system, a conveyance system, an air conditioning system, a fluid pumping system, or some other system adapted to exploit the conversion of electrical energy into rotational mechanical energy. The electric motor 10 may be a brushless synchronous electric motor, as is explained in greater detail below. However, it should be noted that the present technique is not limited to these types of motors. The power source 14 may be a variable or fixed frequency alternating current (AC) power source. In some embodiments, the power source 14 includes a transistorized variable frequency drive configured to deliver three phases of electrical power. The load 18 may be a drive shaft of an electric or hybrid car, a conveyor belt, a pump, a fan, or other system driven by rotational mechanical energy. The load may also represent a prime mover where the "motor" is operating as a generator.

In operation, the power source 14 may output a polyphase alternating current adapted to energize the electric motor 10. For instance, the power source 14 may output three phase electrical power. In response, the rotor in the electric motor 10 rotates about axis of rotation 12 and drive the load 18 via shaft 16. As is explained in greater detail below, magnetic poles within the exemplary motor 10 are arranged so that rotation of the exemplary motor 10 generates relatively little cogging torque.

Figure 2:
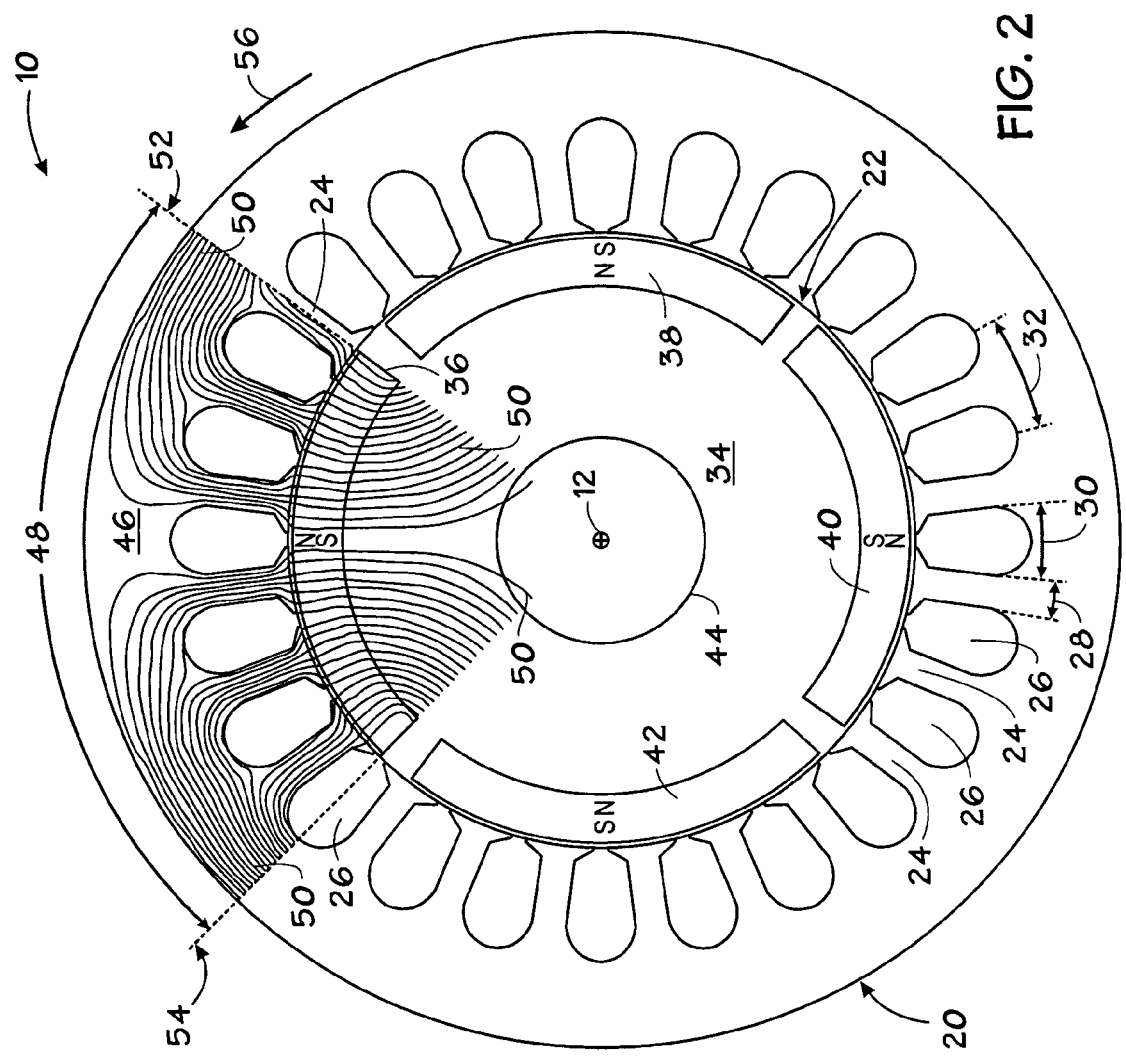
FIG. 2 is a cross-sectional view of an exemplary motor, in accordance with an embodiment of the present technique.

FIG. 2 depicts a cross section of the motor 10 in a plane normal to the axis of rotation 12. The illustrated motor 10 includes a stator 20 and a rotor 22. In the current embodiment, the stator 20 has a plurality of teeth 24 that generally define winding slots 26. The present teeth 24 and winding slots 26 alternate in a rotationally symmetric fashion about the axis of rotation 12. The illustrated teeth 24 each have a tooth width 28, and the illustrated winding slots 26 each have a slot width 30. These distances 28 and 30, like the other distances discussed herein, unless otherwise noted, are angular distances measured about the axis of rotation 12. The tooth width 28 and slot width 30 combine to define a tooth pitch 32, which is the distance between generally identical points of adjacent teeth 24 or slots 26, e.g., centerline to centerline, or clockwise-most edge to clock-wise most edge. In the present embodiment, the teeth 24 and slots 26 have a generally constant cross-sectional profile and angular position along the axis of rotation 12. That is, in the present embodiment, the teeth 24 and the winding slots 26 are not skewed. The illustrated embodiment has 24 teeth and, consequently, 24 winding slots, which, as discussed below, is an integer multiple of the number of poles (e.g., two, four, six, eight, or more) of the rotor 22. In presently contemplated embodiments, the number of teeth 24 is also an integer multiple of the number of phases of power the motor 10 is configured to accept, as well as of the number of poles of the rotor 22. The stator 20 may be made of a ferromagnetic material, such as steel, or other materials. In some embodiments, the stator 20 may be formed by stacked steel plates.

The winding slots 26 will generally house one or more windings (not shown). Depending on the embodiment, the windings may be arranged within and among the winding slots 26 in a variety of patterns, e.g., in a lapped or concentric winding pattern (or some combination). Further, the windings may be arranged according to the number of poles and the number of phases of power delivered to the motor 10. As will be appreciated by those skilled in the art, the windings will generally be terminated in groups depending upon their number, and whether the motor is to be wound in a Y or delta configuration. The stator may also be wound with a coil disposed around each single stator tooth, commonly referred to as a concentrated winding.

The illustrated rotor 22 includes a core 34, permanent magnets 36, 38, 40, and 42, and a shaft 44. The core 34 may have a generally uniform cross section along the axis of rotation 12 and include a ferromagnetic material, such as steel, or other types of materials. The core 34 may be generally concentrically disposed about the shaft 44. In some embodiments, the core 34 and the shaft 44 may be integrated into a single component. In presently contemplated embodiments, the core may be made up of a series of laminates, thin metal plates that may be identical to one another, aligned to form structures for receiving permanent magnets as described below.

The permanent magnets 36, 38, 40, and 42 may be mounted on the surface of the core 34 at 90 degree intervals. That is, the permanent magnets 36, 38, 40, and 42 may be rotationally symmetrically disposed about the axis of rotation 12. Of course, other embodiments having a different number of poles may include magnets disposed in different repetition patterns, such as at intervals of 180 degrees, 60 degrees, 45 degrees, ect., for example. Each permanent magnet 36, 38, 40, and 42 includes a north side and a south side, labeled with an "N" and an "S" respectively. The illustrated permanent magnets 36, 38, 40, and 42 are oriented with their north sides and south sides concentrically disposed about the axis of rotation 12 with the north side of magnets 36 and 40 facing outwardly and the south side of magnets 38 and 42 facing outwardly. That is, in the illustrated embodiment, the permanent magnets 36, 38, 40, and 42 are oriented in alternating directions. While the illustrated permanent magnets 36, 38, 40, and 42 have an arc-shaped cross section with concentric north and south sides, other embodiments may employ different shaped permanent magnets and/or a different number of magnets. Further, the illustrated permanent magnets 36, 38, 40, and 42 have a generally identical shape and are generally parallel with the teeth 24 in the direction of the axis of rotation 12. Consequently, the illustrated permanent magnets 36, 38, 40, and 42 are not skewed along the axis of rotation 12. As explained below, these permanent magnets 36, 38, 40, and 42 may be sized and/or arranged to reduce cogging.

In the current embodiment, the permanent magnets 36, 38, 40, and 42 form four poles 46 about the rotor 22. To clarify the other features of the motor 10, one pole 46 is illustrated in FIG. 2, and the reference numeral 46 will be used to refer to the poles individually and collectively. In the illustrated embodiment, each permanent magnet 36, 38, 40, and 42 forms one pole that is generally rotationally symmetric with the pole 46, with an exception of the reversal of direction of flux for the poles aligned with magnets 38 and 42. That is, the poles 46 are centered at 90 degree intervals about the axis of rotation 12 with an alternating north/south orientation.

The poles 46 may be generally defined by permanent magnets 36, 38, 40, and 42. A flux field 50 is established by one or more of the permanent magnets 36, 38, 40, and 42. Various features, in addition to the permanent magnets 36, 38, 40, and 42, may shape the flux field 50, such as, for example, the shape and magnetic properties of the materials in the stator 20, the rotor 22, and the space between the stator 20 and rotor 22. In some embodiments, discontinuities, such as air gaps or materials with different magnetic properties, may be introduced to the stator 20, the rotor 22, and/or the space between the stator 20 and rotor 22 to shape the flux field 50. The shape of the flux field 50 generally defines the shape of the pole 46. As is explained below, the poles 46 may be shaped so as to reduce cogging.

The poles 46 may each have a pole width 48 bounded by a trailing edge 52 and a leading edge 54, according to a direction of rotation 56 (i.e., the terms "leading" and "trailing" are simply used for convenient reference). In the illustrated embodiment, the widths 48, and edges 52 and 54 of the poles 46 generally correspond with the angular positions of edges of the permanent magnets 36, 38, 40, and 42. However, as subsequent embodiments will illustrate, the width 48, and edges 52 and 54 of a pole 46 are not exclusively a function of the size of the permanent magnets associated with the pole 46. More generally, the edge 52 or 54 of a pole 46 may be defined as the location where there is a distinct change in the air gap flux density. For instance, in some embodiments the air gap flux density may change by more than 30%, 40%, 50%, 60%, 70%, 80%, or more near the edge 52 or 54.

Advantageously, in the present embodiment, the motor 10 exhibits relatively little cogging as the rotor 22 rotates between the teeth 24 of the stator 20. It is believed that the size of the pole width 48 relative to the size of the tooth pitch 28 produces this effect. Specifically, the poles 46 are sized so that when the leading edges 54 are between teeth 24, e.g., in slot 26', the trailing edge is aligned with a tooth, e.g., tooth 24'. In other words, both edges 52 and 54 of poles 46 do no align with teeth 24 at the same time. That is, the poles 46 are spatially desynchronized with the teeth 24. The permanent magnets 36, 38, 40, and 42 are attracted to each of the teeth 24 adjacent their outer surface. As the rotor 22 rotates 56, the number of teeth between the leading edge 54 and trailing edge 52 stays relatively constant. As a result, the aggregate force of attraction to the teeth 24 stays relatively constant, thereby reducing cogging.

FIG. 2 depicts an embodiment in which the leading edge 54 of each pole 46 is aligned with a slot 26 at the same time the trailing edge 52 is aligned with a tooth 24. Other embodiments may have varying degrees of misalignment. For example, in some embodiments, the smallest difference in angular size between the pole width 48 and an integer multiple of the tooth pitch 32 may be greater than or generally equal to 50%, 40% 30%, 20%, or 10% of the tooth pitch 32. In other words, the remainder of the pole width 48 divided by the tooth pitch 32 may be a variety of percentages of the tooth pitch 32.

Figure 3:
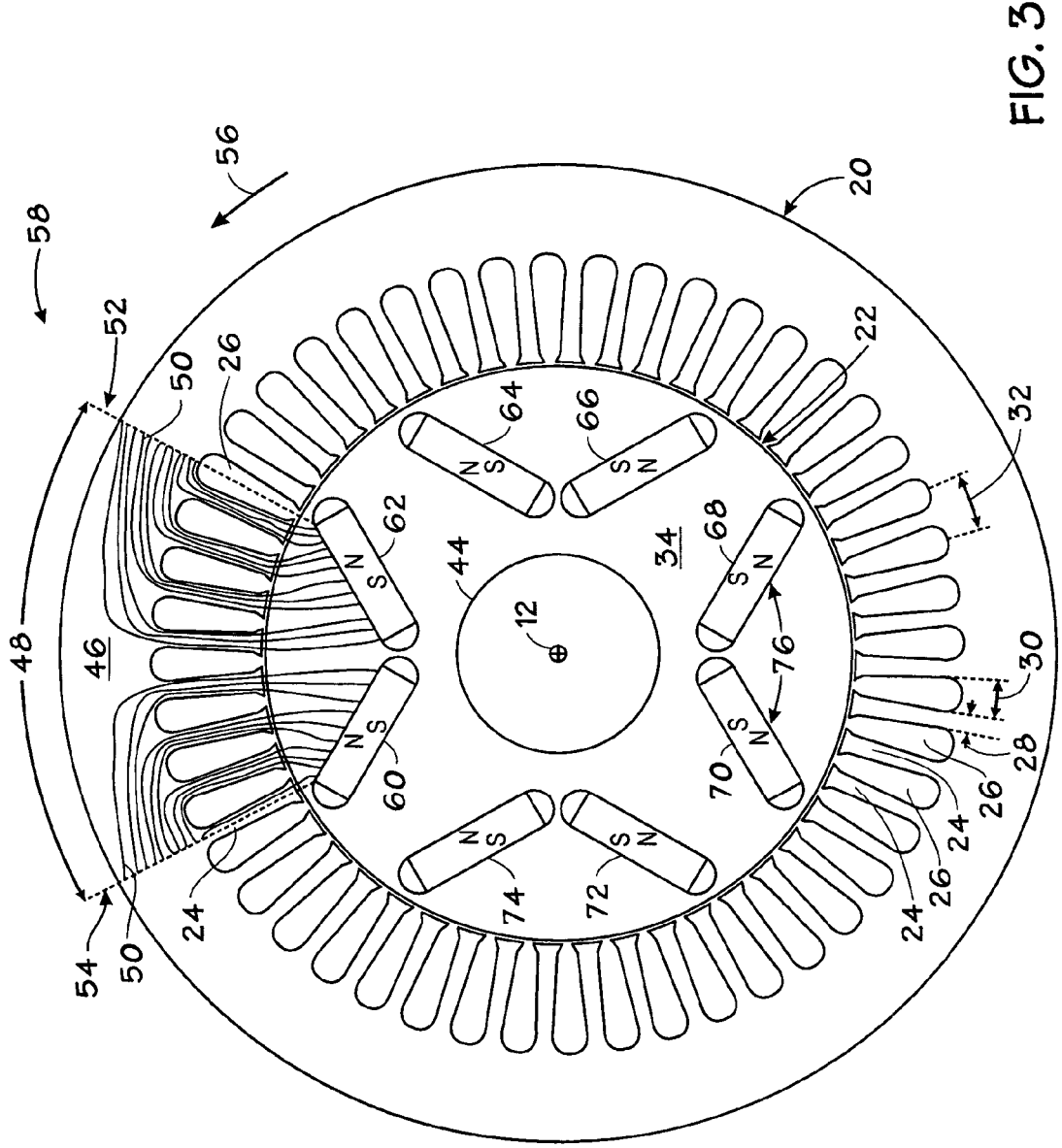
FIG. 3 is a cross-sectional view of another exemplary motor, in accordance with an embodiment of the present technique.

FIG. 3 depicts another exemplary electric motor 58 in accordance with the present technique. The present electric motor 58 has 48 teeth 24 disposed between 48 slots 26. As with the previous embodiment, the illustrated teeth 24 are generally parallel to the axis of rotation 12, i.e., not skewed. Of course, other embodiments may have a different number of teeth 24, for instance a number that is an integer multiple of the number of poles 46, the number of phases of electrical power, or both. The illustrated electric motor 58 includes four poles 46, and accepts three phases of electrical power.

The illustrated motor 58 includes two permanent magnets 60 and 62, 64 and 66, 68 and 70, or 72 and 74 per pole 46. Each of the illustrated permanent magnets 60, 62, 64, 66, 68, 70, 72, and 74 extends generally parallel with the teeth 24 and the axis of rotation 12. That is, the permanent magnets 60, 62, 64, 66, 68, 70, 72, and 74 are not skewed in the present embodiment. The present magnets are internally mounted within the core 34 in slots. End plates at the ends of the rotor 22 and an adhesive may secure the permanent magnets 60, 62, 64, 66, 68, 70, 72, and 74 in the slots. The present permanent magnets 60, 62, 64, 66, 68, 70, 72, and 74 are mounted in V-shaped pairs that are rotationally symmetrically disposed about the axis of rotation 12. In the present embodiment, the permanent magnets 60, 62, 64, 66, 68, 70, 72, and 74 form four poles 46 that are evenly distributed about the rotor 22, in 90 degree increments. In the present embodiments, the four poles 46 do not occupy the entire 90 degree increment. Of course, other embodiments may employ more or fewer permanent magnets to form more or fewer poles 46. In the illustrated embodiment, the V-shaped pairs of magnets, such as 68 and 70, are disposed with an angle 76 between faces of the same magnetic orientation.

The angle 76, along with other parameters, may generally define the pole width 48, the position of the leading edge 54, and the position of the trailing edge 52. In some embodiments, the angle 76 is approximately 109, 111, 113, 115, 117, 119, 121, 123, 125, 127, or 129 degrees. For example, an angle 76 of 119 degrees may define a pole width 48 that is not a multiple of the tooth pitch 28. Alternatively, or additionally, the width of the permanent magnets 60 and 62, 64 and 66, 68 and 70, or 72 and 74 may be selected to achieve a desired pole width 48. As depicted in FIG. 3, when the leading edge 54 of electric motor 58 is aligned with tooth 24', the trailing edge 52 aligned with slot 26', and not with a tooth 24. As with the previous embodiment, the degree of misalignment may vary. For example, the smallest difference in angular size between the pole width 48 and an integer multiple of the tooth pitch 32 may be greater than or generally equal to 50%, 40% 30%, 20%, or 10% of the tooth pitch 32.

Figure 4:
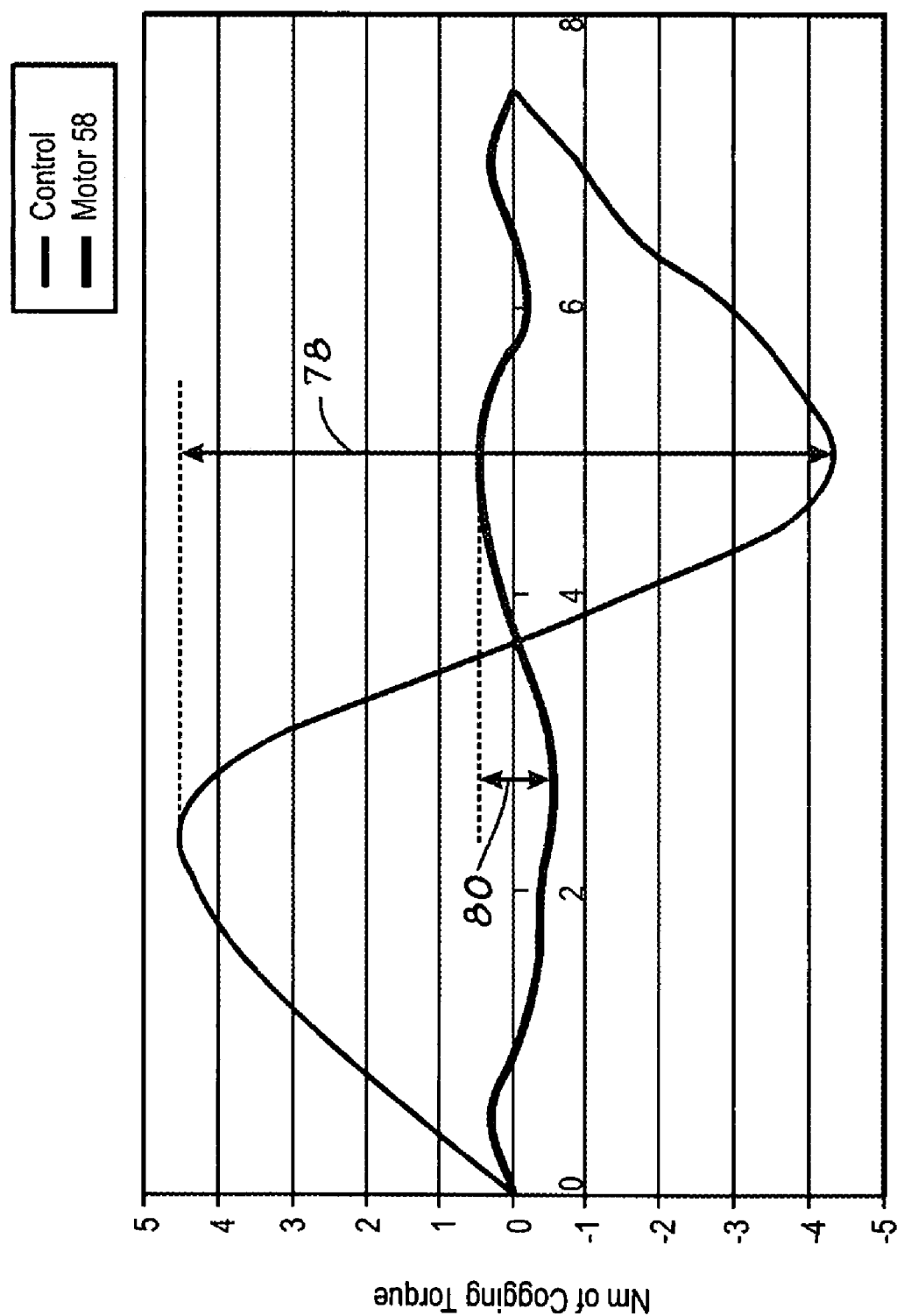
FIG. 4 is a graph of cogging torque as a function of rotor angle in a control motor and in the exemplary motor of FIG. 3.

FIG. 4 illustrates cogging in electric motor 58 and a control motor versus an angular position of the rotor 22. In FIG. 4, the ordinate represents cogging torque, in Newton-meters, and the abscissa represents angular rotation of the rotor 22, in degrees. The control motor, which exhibits large cogging torques, was modeled such that the leading and trailing edges of the flux of each pole aligned with stator teeth at the same point in rotation of the rotor (i.e., the pole width was an integer multiple of the pitch of the stator teeth). The magnitude of cogging 78 produced by the control motor is substantially larger than the magnitude of the cogging produced by the electric motor 58. Indeed, with the present embodiment, the magnitude of cogging is reduced to less than $1/7^{th}$ of the magnitude of cogging in the control motor. Of course, other embodiments may exhibit smaller or greater reductions in the magnitude of cogging torque.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A permanent magnet motor comprising:
   a rotor having a shaft and a contiguous rotor core extending along the shaft, the rotor having a plurality of permanent magnets defining a plurality of poles, wherein each pole is defined by permanent magnets that are mounted in a V-shaped arrangement, the V-shaped arrangement for each pole being formed with the same obtuse angle and each pole being equiangularly spaced about a center axis of the rotor, each pole having a leading edge and a trailing edge; and a stator having a plurality of teeth that are generally parallel to the permanent magnets, wherein the number of teeth is an integer multiple of the number of poles, wherein when the leading edge of each pole aligns with a stator tooth the trailing edge of that pole is generally not aligned with a stator tooth.

2. The permanent magnet motor of claim 1, wherein each permanent magnet is defined by two permanent magnetic elements that are mounted in the V-shaped arrangement.

3. The permanent magnet motor of claim 2, wherein the number of poles is four, the number of teeth is 48, and the two permanent magnetic elements defining each pole are mounted at a 119 degree angle.

4. The permanent magnet motor of claim 1, wherein the number of poles is an even number integer no less than 2.

5. The permanent magnet motor of claim 1, wherein the teeth are generally parallel to an axis of rotation of the permanent magnet motor.

6. The permanent magnet motor of claim 1, wherein the poles are rotationally symmetric.

7. The permanent magnet motor of claim 1, comprising windings disposed between the teeth and configured to accept three phases of electrical power.

8. The permanent magnet motor of claim 1, wherein the contiguous rotor core is formed from a plurality of laminations with like geometry mounted on the shaft uniformly along an axis of the shaft.

9. The permanent magnet motor of claim 1, wherein the leading edge and the trailing edge of each pole correspond to locations with a distinct change in air gap flux density.

10. An electric motor, comprising:

a rotor having a shaft and a contiguous rotor core extending along the shaft with a plurality of permanent magnets embedded therein, each of the magnets having a V-shaped cross-section with an obtuse angle therebetween, the obtuse angle being the same for each magnet, and each magnet being equiangularly spaced about a center the rotor, the V-shaped cross-section being defined by an inner V-surface and an outer V-surface, each of the magnets being magnetized to cause the inner V-surface and the outer V-surface to have a different polarity, each magnet defining a pole with a first edge and a second edge; and a stator having winding slots separated by respective teeth, the number of teeth being an integer multiple of the number of poles, wherein at least one pole edge does not generally align with a tooth at the same time that another pole edge generally aligns with a tooth.

11. The electric motor of claim 10, wherein each of the magnets comprises a pair of magnetic elements separated by a gap.

12. The electric motor of claim 11, wherein the gap is disposed between two spaces, the two spaces housing the pair of magnet elements and extending through the contiguous rotor core.

13. The electric motor of claim 10, wherein the number of poles is four, the number of teeth is 48, and the angle between the inner V-Shaped cross section is 119 degrees.

14. The electric motor of claim 10, wherein the number of poles is an even number integer no less than 2.

15. The electric motor of claim 10, wherein the obtuse angle is between 109 and 129 degrees.

16. The electric motor of claim 10, wherein the number of poles is four, the number of teeth is 48, and the angle between the outer V-Shaped cross section is 119 degrees.

17. The electric motor of claim 10, wherein the contiguous rotor core is formed from a plurality of laminations with like geometry mounted on the shaft uniformly along an axis of the shaft.

18. The electric motor of claim 10, wherein the pole first and second edges correspond to locations with a distinct change in air gap flux density.

* * * * *